March 31, 1970    M. M. ANTHONE    3,503,088
DETACHABLY MOUNTED RESIDUE REMOVER
Filed Nov. 13, 1968
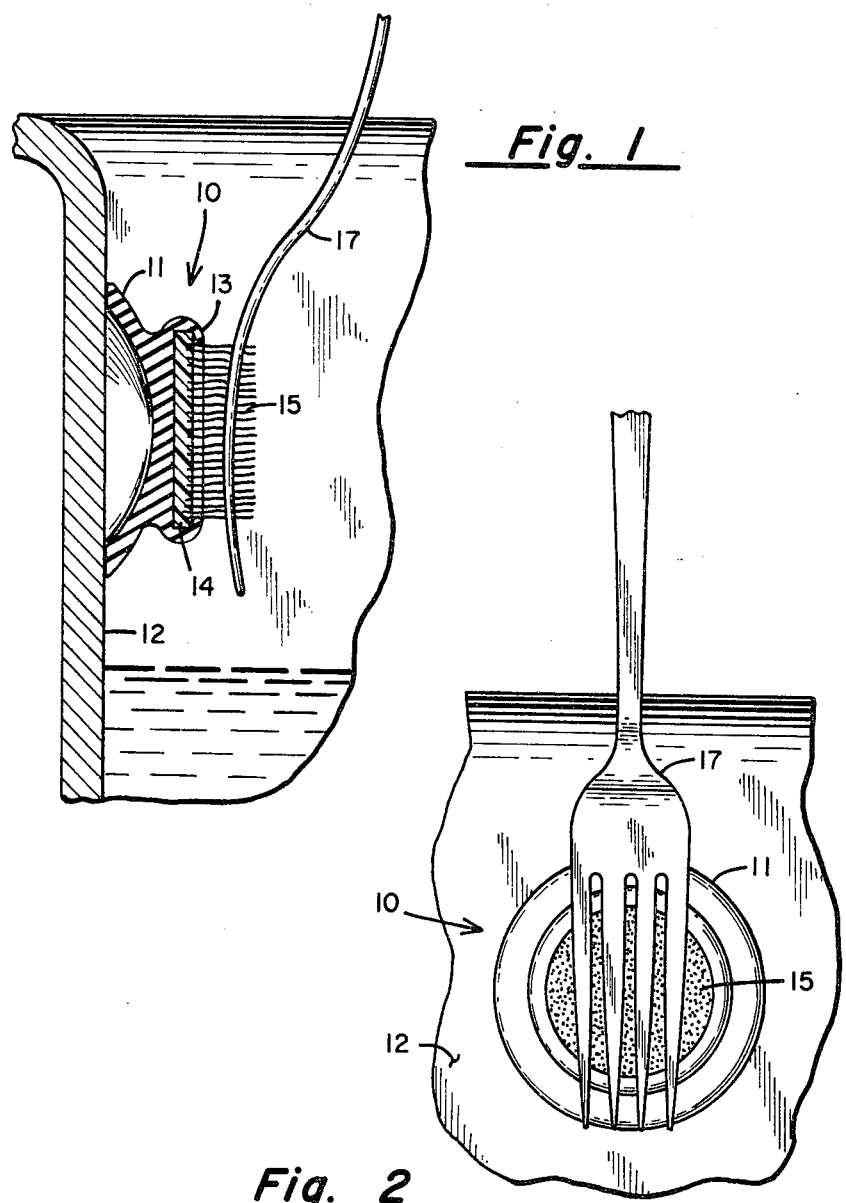
INVENTOR
MARCELLA M. ANTHONE
BY
ATTORNEYS United States Patent Office 3,503,088
Patented Mar. 31, 1970

3,503,088
DETACHABLY MOUNTED RESIDUE REMOVER
Marcella M. Anthone, 594 E. County Road B-2,
St. Paul, Minn. 55717
Filed Nov. 13, 1968, Ser. No. 775,359
Int. Cl. A46b 1/00
U.S. Cl. 15—160            2 Claims

ABSTRACT OF THE DISCLOSURE

A utensil cleaning device having a bristle brush suitable for mounting on a kitchen sink to allow a user to clean residue from inaccessible places on utensils with one hand.

BACKGROUND OF THE INVENTION

Field of the invention

This invention relates generally to utensil cleaning devices and, more specifically, to utensil cleaning devices for detachably mounting on a wall to allow a user to clean a utensil with one hand.

Description of the prior art

Typically prior art utensil cleaning devices comprise a plastic or bristle brush that the user holds in his hand. To remove any residue located in inaccessible places on the utensil, a user holds the brush in one hand the utensil in the other and then proceeds to scrub the utensil with the brush. The user must employ both hands to clean a utensil in this manner as well as considerably groping for the brush each time a utensil needs special cleaning. Normally the user cleans the dishes and utensil in a sink containing a cleaning solution. A light scrubbing action of a dish cloth removes the major portion of leftover food particles or residue on the dishes and utensils. However, occasionally food residue clings to inaccessible places in the utensil. This is particularly true in cases of utensils such as forks where the food residue readily clings to the area between the tines. In order to clean between the tines the user must lay down the dish cloth and then pick up the brush in one hand and then with the brush in one hand and the utensil in the other hand, scrub the utensil. Next the user lays the brush down, picks up the dish cloth and begins cleaning the remaining utensils and dishes until another utensil is found that contains food residue located in an inaccessible place. The user then repeats the process to clean this utensil. Obviously this creates a nuisance to the user or the dishwasher as he is continually searching for either the brush or the dish cloth every time he has to clean a utensil.

In order to eliminate this unnecessary handling and continually groping for the cleaning brush or the dish cloth, I have invented a cleaning brush that can be readily mounted on a flat or curved surface such as a kitchen sink. Mounting a brush to the kitchen sink the user can grasp the dirty utensil in one hand and in the same motion stab it into the brush to quickly clean the residue remaining on the utensil. This eliminates the needless groping for either the brush or the dish cloth at any time a utensil has to be given special attention.

SUMMARY OF THE INVENTION

Briefly, the invention comprises a detachable mounted brush that attaches to a sink or the like so as to allow the user to clean residue from utensils with one hand.

BRIEF DESCRIPTION OF THE DRAWING

FIG. 1 is a vertical section view of my cleaning device in cleaning engagement with a fork; and
FIG. 2 is a front view of my cleaning device showing a fork in cleaning engagement with my cleaning device.

DESCRIPTION OF THE PREFERRED EMBODIMENT

Referring to FIGS. 1 and 2, my detachably mounted cleaning device is generally designated by reference numeral 10. Cleaning device 10 comprises a conventional vacuum cup 11 which is detachably mounted to a surface such as a sink wall 12. The backside of vacuum cup 11 contains a pliable retaining flange 13 for securely and removably supporting a bristle backing plate 14. Backing plate 14 is a straight plate containing a plurality of bristles 15 impregnated therein. The individual bristles may be either straight or slightly zigzag. If the bristles are slightly zigzag, it produces a better cleaning action, however, either type of bristles will work satisfactorily.

Typically, the diameter of vacuum cup 11 does not exceed two inches and the diameter of the cleaning bristles or backing plate 15 does not exceed one and one-half inches in diameter. The bristles are approximately one-half inch long and are mounted in a parallel forward extending relation from back plate 12. These dimensions are typical and it is apparent that other size cleaning devices could also be made and applicant does not wish to limit herself to these dimensions.

Typically, the backing plate comprises a medium density urethane plastic for supporting polypropylene bristles that are six mils in diameter and approximately one-half inch long. The bristles whether straight or zigzag are mounted in parallel forward extending relation so as to allow food particles to escape from between the bristles quite readily.

Another feature of the invention is that the brush backing plate 14 can be readily removed and replaced by merely inserting a new brush and backing plate into retaining flange 13 located on the backside of vacuum cup 11.

Preferably, the brush bristles are made from a plastic or polypropylene so as to be nonabsorbent and not readily retain any food residue which would cause odor if it should be stored. Also this bristle brush is readily cleaned as the user merely removes it from the sink wall and swishes it through the water to quickly remove any food particles or residue left between the bristles.

In operation of my cleaning device the user forces the vacuum cup against the sink wall, preferably slightly above the water line so it is readily visible to the user and also to allow the user to quickly rinse the utensil after it has been in cleaning engagement with the brush. With the cleaning device mounted in the sink the user grasps a dirty utensil, such as a fork, and stabs it into the bristles 14 to quickly remove any food particles or residue left on the utensil. Because the vacuum securely holds the brush to the sink, the user can generally give a greater impact force to food particles remaining on the tines than with conventional scrubbing action. That is, an operator can quickly stab the dirty utensil into the cleaning brush thus tending to dislodge the particles somewhat easier than through the conventional scrubbing action.

I claim:
1. A utensil cleaning device adaptable for mounting on a sink wall comprising: a brush cleaning element, said brush element having a rigid flat backing plate; said back- ing plate supporting elongated non-absorbent individually mounted relatively stiff bristles in a parallel extending relation; said bristles being substantially uniformly spaced on said backing plate and having the ends define a substantially plane surface; a vacuum cup for detachably fastening above the water line of the sink or the like; a retaining flange on said vacuum cup, said flange rigidly supporting said backing plate and said bristle so that a user using only one hand can quickly stab a utensil into said bristles to quickly remove residue on the utensil.

2. The invention as described in claim 1 wherein said non-absorbent bristles are made of polypropylene, said bristles having a diameter of approximately six mils and a length of approximately one-half inch long.

References Cited

UNITED STATES PATENTS

| 1,372,612 | 3/1921 | Finkhousen | 15—160 |
| 2,689,968 | 9/1954 | Rissler | 15—236 |
| 2,817,864 | 12/1957 | Morton | 15—160 XR |

PETER FELDMAN, Primary Examiner